United States Patent
Sahasranaman et al.

(10) Patent No.: US 10,491,948 B2
(45) Date of Patent: Nov. 26, 2019

(54) SERVICE ACQUISITION FOR SPECIAL VIDEO STREAMS

(71) Applicant: ARRIS Enterprises LLC, Suwanee, GA (US)

(72) Inventors: Murali S. Sahasranaman, Bangalore (IN); Virendra Singh, Bangalore (IN); Lakshmi Arunkumar, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/977,126

(22) Filed: May 11, 2018

(65) Prior Publication Data

US 2018/0332343 A1   Nov. 15, 2018

Related U.S. Application Data

(60) Provisional application No. 62/504,609, filed on May 11, 2017.

(51) Int. Cl.
| | |
|---|---|
| *H04N 21/658* | (2011.01) |
| *H04N 21/44* | (2011.01) |
| *H04N 21/6583* | (2011.01) |
| *H04N 21/845* | (2011.01) |
| *H04N 21/234* | (2011.01) |
| *H04N 21/434* | (2011.01) |
| *H04N 21/472* | (2011.01) |
| *H04N 21/426* | (2011.01) |

(52) U.S. Cl.
CPC . *H04N 21/44004* (2013.01); *H04N 21/23406* (2013.01); *H04N 21/42607* (2013.01); *H04N 21/4345* (2013.01); *H04N 21/472* (2013.01); *H04N 21/6581* (2013.01); *H04N 21/6583* (2013.01); *H04N 21/8456* (2013.01)

(58) Field of Classification Search
None
See application file for complete search history.

(56) References Cited

U.S. PATENT DOCUMENTS

| | | | | |
|---|---|---|---|---|
| 7,409,702 | B2 * | 8/2008 | Cao | H04N 21/235 370/486 |
| 9,223,643 | B2 * | 12/2015 | Cooper | G06F 11/07 |
| 2003/0219235 | A1 * | 11/2003 | Nakatani | H04N 5/76 386/230 |
| 2011/0131620 | A1 * | 6/2011 | Holley | H04H 20/12 725/98 |
| 2017/0311032 | A1 * | 10/2017 | Drisko | H04N 21/4384 |
| 2018/0332343 | A1 * | 11/2018 | Sahasranaman | H04N 21/42607 |

* cited by examiner

*Primary Examiner* — Hsiungfei Peng
(74) *Attorney, Agent, or Firm* — Bart A. Perkins

(57) ABSTRACT

Methods, systems, and computer readable media can be operable to facilitate a transfer of one or more buffer chunks including an I-Frame. When a new play or media transition occurs, a transfer of buffer chunks from a buffer to a decoder may be initiated such that an I-Frame at the beginning of the buffer is transferred and available to a client for playback. A decoder may be flushed a new transfer of buffer chunks beginning with the first buffer chunk may be initiated when a determination is made that PAT/PMT acquisition is complete and A/V play has started. A first buffer chunk may be repetitively transferred from the buffer until a determination is made that PAT/PMT acquisition is complete and A/V play has started.

14 Claims, 5 Drawing Sheets

SERVICE ACQUISITION FOR SPECIAL VIDEO STREAMS

CROSS REFERENCE TO RELATED APPLICATION

This application is a non-provisional application claiming the benefit of U.S. Provisional Application Ser. No. 62/504,609, entitled "Service Acquisition Methods to Handle Special Video Streams," which was filed on May 11, 2017, and is incorporated herein by reference in its entirety.

TECHNICAL FIELD

This disclosure relates to service acquisition for special video streams.

BACKGROUND

Typically, an H.264 transport stream contains at least one I-Frame in a two (2) second video fragment. Considering the number of users on field and specialized video streams (e.g., customized video streaming of the EPG (electronic program guide) screens to each user), a sheer bandwidth issue is created, and it becomes virtually impossible for a broadcaster to have I-Frames inserted at regular intervals for each user. Therefore, these specialized or customized video streams generally only contain a single I-Frame at the beginning of the stream, the single I-Frame being followed by only PB Slices. Unless the user goes into a menu that has an entirely different user interface, another I-Frame may not be sent at all.

The service acquisition process across typical set-top boxes (STB) generally adheres to the following steps:

(1) On a tuner lock on the QAM (quadrature amplitude modulation) path or on a lock on the IP (Internet protocol) path for HLS (HTTP live streaming), read and buffer up an entire block of the content. This is done immediately after the lock acquisition. The purpose of this buffer is to complete the acquisition process. This buffer can be termed as the "Acquisition Buffer".

(2) Parse the Acquisition Buffer to look for the PAT and PMT SI tables and obtain all the PID information required.

(3) Program the PIDS on the Demux/Decoders, declare the acquisition was successful, and discard the Acquisition Buffer.

(4) Look for the next I-Frame and present the video subsequently after that.

With a typical transport stream, the acquisition process described above is sufficient as the typical transport stream contains repeating I-Frames.

However, with a specialized or customized content stream (e.g., guide streams, etc.), the single and only I-Frame at the beginning of the content stream is consumed as part of the Acquisition Buffer, and the service acquisition module is unable to find subsequent I-Frames. Hence, no video is rendered and the screen stays blank.

Further, in the case of content streams which do have successive I-Frames but the first I-Frame is important to use or understand the content (e.g., a gaming video that is streamed to the user in which the very first I-Frame shows the instructions to play the game), missing this crucial I-Frame can defeat the purpose of the content.

Moreover, H.264 specifications allow for very long GOPs (group of pictures) in a H.264 transport stream. Therefore, if a H.264 transport stream contains an I-Frame in the beginning and the next I-Frame occurs after a significantly long time or never occurs at all, it is still a compliant stream. In the scenario where a STB successfully tunes to the first I-Frame and starts playing the video, and a hand-held device (e.g., a mobile device such as a tablet, mobile device, etc.) connects to the STB to lock on to the same content to play, the hand-held device may be unable to play the content as it would only receive the P and B Frames since the I-Frame was consumed by the STB. If the next I-Frame does not occur at all, the hand-held device may never be able to play the content.

Therefore, it is desirable to improve upon methods and systems for transferring content from a buffer to a decoder for content playback.

BRIEF DESCRIPTION OF THE DRAWINGS

Like reference numbers and designations in the various drawings indicate like elements.

DETAILED DESCRIPTION

It is desirable to improve upon methods and systems for transferring content from a buffer to a decoder for content playback. Methods, systems, and computer readable media can be operable to facilitate a transfer of one or more buffer chunks including an I-Frame. When a new play or media transition occurs, a transfer of buffer chunks from a buffer to a decoder may be initiated such that an I-Frame at the beginning of the buffer is transferred and available to a client for playback. A decoder may be flushed a new transfer of buffer chunks beginning with the first buffer chunk may be initiated when a determination is made that PAT/PMT acquisition is complete and A/V play has started. A first buffer chunk may be repetitively transferred from the buffer until a determination is made that PAT/PMT acquisition is complete and A/V play has started.

Figure 1:
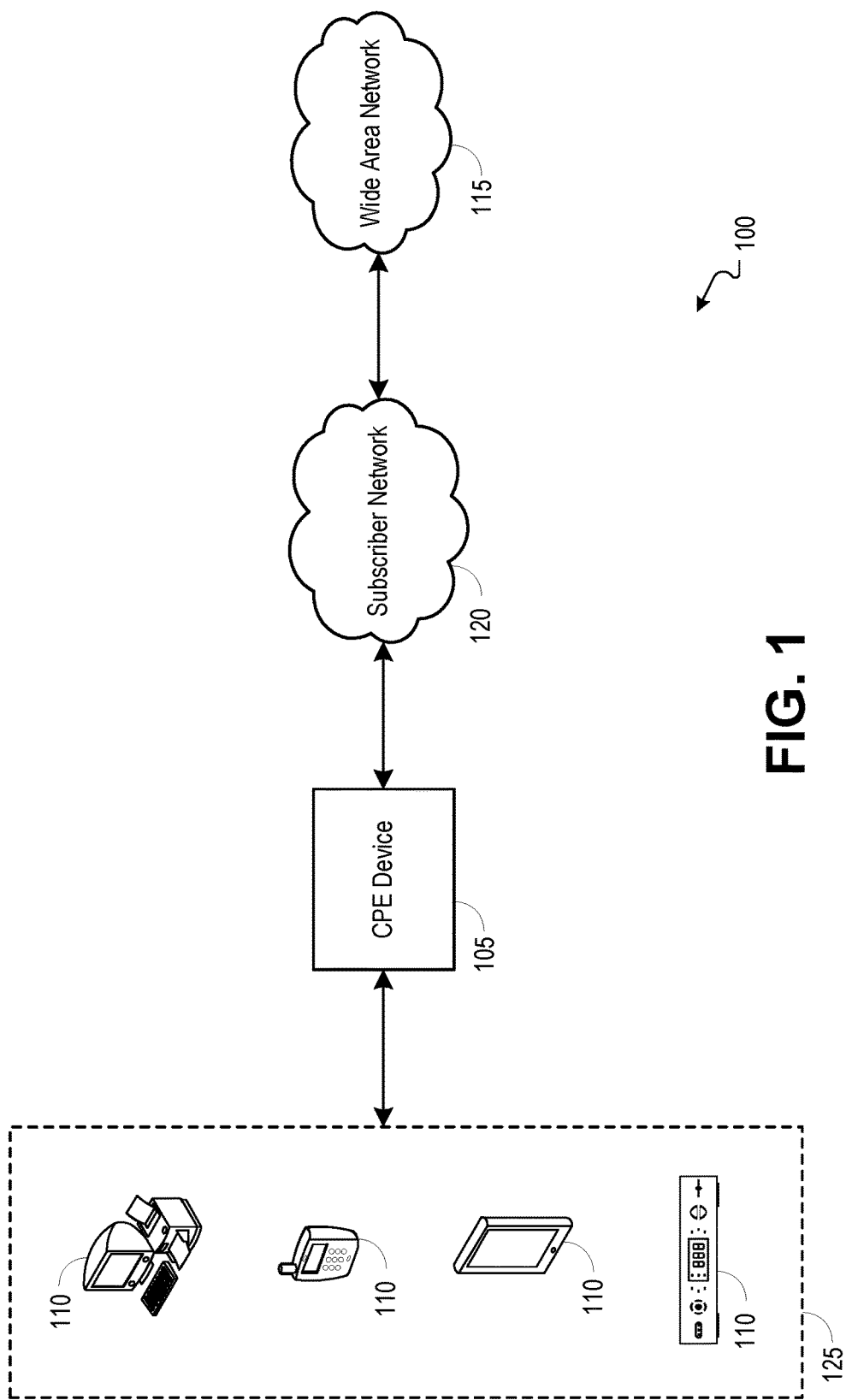
FIG. 1 is a block diagram illustrating an example network environment operable to facilitate a transfer of one or more buffer chunks including an I-Frame.

FIG. 1 is a block diagram illustrating an example network environment 100 operable to facilitate a transfer of one or more buffer chunks including an I-Frame. In embodiments, one or more CPE (customer premise equipment) devices 105 (e.g., set-top box (STB), multimedia gateway device, wireless router including an embedded modem, wireless network extender, DLNA multimedia device, access point, etc.) may provide video, data and/or voice services to one or more client devices 110 by communicating with a wide area network (WAN) 115 through a connection to a subscriber network 120 (e.g., a local area network (LAN), a wireless local area network (WLAN), a personal area network (PAN), mobile network, high-speed wireless network, etc.). For example, a subscriber can receive and request video, data and/or voice services through a variety of client device types. Client devices 110 may include a television, computer, tablet, mobile device, STB, and others. It should be understood that a CPE device 105 may communicate directly with, and receive one or more services directly from a subscriber network 120 or WAN 115. A client device 110 may receive the requested services through a connection to a CPE device 105, through a direct connection to a subscriber network 120 (e.g., mobile network), through a direct connection to a WAN 115, or through a connection to a local network 125 that is provided by a CPE device 105. While the components shown in FIG. 1 are shown separate from each other, it should be understood that the various components can be integrated into each other.

In embodiments, a CPE device 105 may retrieve content and/or information in response to a user request for the content and/or information. For example, the user request may be received from a client device 110, and the content and/or information may be received from an upstream server. The content and/or information may be received by the CPE device 105 as one or more packets (e.g., a packet stream such as an H.264 transport stream), and the CPE device 105 may store the one or more packets in an acquisition buffer. For example, to initiate an IP (Internet protocol) playback, the CPE device 105 may send the content data to middleware as a sequence of buffer memory chunks which are transmitted to the decoders to play the video.

In embodiments, the data stored in the acquisition buffer may include the content data from the beginning of the content to a point when the PAT (program association table)/PMT (program map table) has been acquired and parsed and the A/V (audio/video) PIDs (packet identifiers) are known. The content stored in the acquisition buffer may be accumulated in the pipeline memory of the CPE device 105.

In embodiments, the CPE device 105 may transfer the data (e.g., buffer chunks) from the acquisition buffer to a demultiplexer and decoder for A/V play. For example, the CPE device 105 may transfer the buffer chunks using a DMA (direct memory access) operation.

In embodiments, when a transfer of content occurs at the CPE device 105, a re-transfer of buffer chunks within the acquisition buffer may begin once the PMT has been processed and A/V play has been initiated. After processing of the PMT and confirmation that A/V play has been initiated, a write pointer of the pipeline may be shuffled to the top of the acquisition buffer, a decoder may be flushed of any previous data, and the PTS (presentation time stamp) value may be reset. With the write pointer of the pipeline shuffled to the top, the content from the acquisition buffer may once again be transferred to the decoder, thus the I-Frame that is part of the acquisition buffer may be acquired by a player and A/V play may start.

In embodiments, if the pipeline memory is filled before the PMT processing occurs, then the entire content of the pipeline may be cached before it is overwritten with new data.

In embodiments, upon receiving a first buffer chunk (which contains the only I-Frame), this first buffer chunk may be repetitively sent to the demultiplexer and decoders in a continuous loop until a determination is made that the PAT/PMT has been acquired and the video play has been started. Once it is known that the video play has been started, the decoder buffers may be flushed, the PTS may be reset, and the first buffer chunk may be transferred once more, thereby ensuring that a fresh playback starts from the beginning of the content with the I-Frame rendered. After transferring the first buffer chunk, subsequent buffer chunks may be transferred and the video play may continue.

When a PAT or PMT version change (e.g., due to a change in the video PID, etc.) occurs during the middle of a play, the content needs to be re-acquired. During the re-acquisition process, the decoder programmed with the new video PID would again look for an I-frame to start rendering the video. A PAT or PMT version change may be a trigger for the CPE device 105 to initiate a transfer of buffer chunks that includes the I-Frame.

In embodiments, a hand-held client device 110 (e.g., a mobile device, tablet, etc.) may connect live to the CPE device 105 after the first and only I-Frame was rendered by the CPE device 105. In this scenario, the CPE device 105 may supply the content to the hand-held client device 110 from the LOD (Live Off Disk) so that the entire piece of content (starting with the first I-Frame) reaches the hand-held client device 110, thereby allowing the hand-held client device 110 to play the content.

Figure 2:
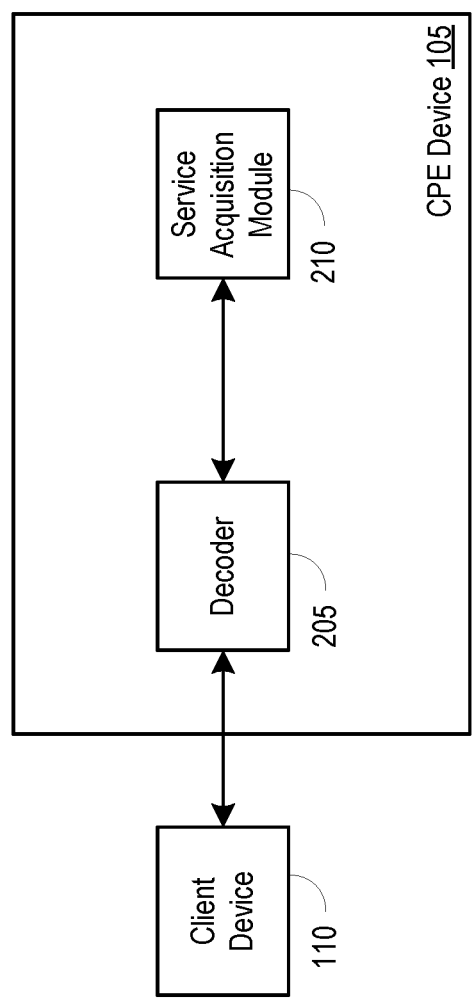
FIG. 2 is a block diagram illustrating a CPE device operable to facilitate a transfer of one or more buffer chunks including an I-Frame.

FIG. 2 is a block diagram illustrating a CPE device 105 operable to facilitate a transfer of one or more buffer chunks including an I-Frame. The CPE device 105 may include a decoder 205 and a service acquisition module 210. In embodiments, the CPE device 105 may be a set-top box (STB), multimedia gateway device, wireless router including an embedded modem, wireless network extender, DLNA multimedia device, and/or any other device that may provide video, data and/or voice services to one or more client devices 110.

In embodiments, the CPE device 105 may retrieve content and/or information in response to a user request for the content and/or information. For example, the user request may be received from a client device 110, and the content and/or information may be received from an upstream server. The content and/or information may be received by the CPE device 105 as one or more packets (e.g., a packet stream such as an H.264 transport stream), and the CPE device 105 may store the one or more packets in an acquisition buffer.

In embodiments, the data stored in the acquisition buffer may include the content data from the beginning of the content to a point when the PAT (program association table)/PMT (program map table) has been acquired and parsed and the A/V (audio/video) PIDs (packet identifiers) are known. The content stored in the acquisition buffer may be accumulated in the pipeline memory of the CPE device 105.

In embodiments, the service acquisition module 210 may transfer the data (e.g., buffer chunks) from the acquisition buffer to a demultiplexer and decoder 205 for A/V play. For example, the service acquisition module 210 may transfer the buffer chunks using a DMA (direct memory access) operation.

In embodiments, when a transfer of content occurs at the CPE device 105, a re-transfer of buffer chunks within the acquisition buffer may begin once the PMT has been processed and A/V play has been initiated. After processing of the PMT and confirmation that A/V play has been initiated, a write pointer of the pipeline may be shuffled to the top of the acquisition buffer, a decoder 205 may be flushed of any previous data, and the PTS (presentation time stamp) value may be reset. With the write pointer of the pipeline shuffled to the top, the content from the acquisition buffer may once again be transferred to the decoder 205, thus the I-Frame that is part of the acquisition buffer may be acquired by a player and A/V play may start.

In embodiments, upon receiving a first buffer chunk (which contains the only I-Frame), this first buffer chunk may be repetitively sent to the demultiplexer and decoder 205 in a continuous loop until a determination is made that the PAT/PMT has been acquired and the video play has been started. Once it is known that the video play has been started, the decoder 205 may be flushed, the PTS may be reset, and the first buffer chunk may be transferred once more, thereby ensuring that a fresh playback starts from the beginning of the content with the I-Frame rendered. After transferring the first buffer chunk, subsequent buffer chunks may be transferred and the video play may continue.

Figure 3:
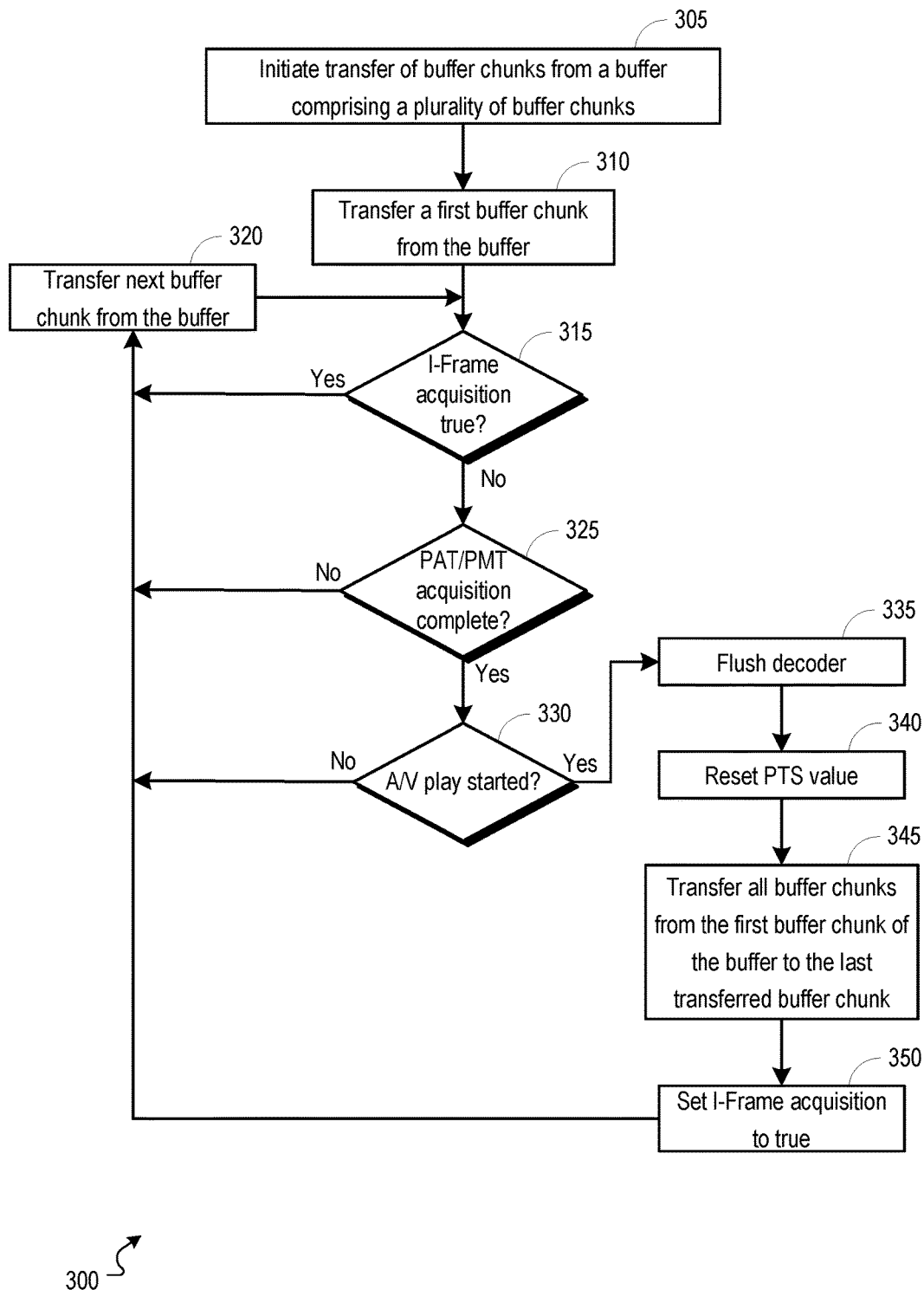
FIG. 3 is a flowchart illustrating an example process operable to facilitate a re-use of buffer chunks within an acquisition buffer.

FIG. 3 is a flowchart illustrating an example process 300 operable to facilitate a re-use of buffer chunks within an acquisition buffer. The process 300 can begin at 305, when a transfer of buffer chunks from a buffer comprising a plurality of buffer chunks is initiated. In embodiments, the transfer of buffer chunks from the buffer may be initiated in response to a request for content or information. For example, a CPE device (e.g., CPE device 105 of FIG. 1) may receive a request for content (e.g., multimedia content, gaming content, etc.) or information (e.g., guide data, EPG (electronic program guide) data, etc.) from a user and/or client device (e.g., client device 110 of FIG. 1). In response to the request for content or information, the CPE device 105 may retrieve one or more packets associated with the content or information (e.g., from a server such as an upstream server), and the CPE device 105 may store the retrieved one or more packets in a buffer (e.g., within an acquisition buffer) as one or more buffer chunks. The CPE device 105 may initiate a transfer of the buffer chunks from the buffer to a decoder (e.g., decoder 205 of FIG. 2).

At 310, a first buffer chunk may be transferred from the buffer. In embodiments, the CPE device 105 may transfer the first buffer chunk in the buffer to a decoder (e.g., decoder 205 of FIG. 2). For example, a DMA (direct memory access) operation may be utilized to transfer the first buffer chunk from the buffer to a demultiplexer and decoder for A/V play.

At 315, a determination may be made whether I-Frame acquisition is true. The determination whether I-Frame acquisition is true may be made, for example, by the CPE device 105. In embodiments, the determination whether I-Frame acquisition is true may be based upon whether a designated trigger has occurred as a result of a first I-Frame being processed. For example, a flag (e.g., first_picture interrupt (or some similar names)) may be triggered when the first I-Frame is processed, and the flag may provide an indication as to whether the first I-Frame processing is complete. Interested subscribers (e.g., AV and SA modules) may be notified of this event.

If, at 315, the determination is made that I-Frame acquisition is true, the process 300 may proceed to 320. At 320, the next buffer chunk in the buffer may be transferred. In embodiments, the CPE device 105 may transfer the next buffer chunk in the buffer to a decoder (e.g., decoder 205 of FIG. 2). For example, a DMA operation may be utilized to transfer the next buffer chunk from the buffer to a demultiplexer and decoder for A/V play. After the next buffer chunk is transferred from the buffer, the process 300 may return to 315.

If, at 315, the determination is made that I-Frame acquisition is not true, the process 300 may proceed to 325. At 325, a determination may be made whether PAT/PMT acquisition is complete. The determination whether PAT/PMT acquisition is complete may be made, for example, by the CPE device 105. In embodiments, the determination whether PAT/PMT acquisition is complete may be based upon a determination whether audio/video PID values have been successfully determined. For example, ProcessPAT( ) or ProcessPMT( ) callback functions may be invoked automatically when a section filter detects a PAT or PMT packet in the incoming stream. If the PMT is processed successfully, the audio/video PID values are determined correctly. The service acquisition module (e.g., service acquisition module 210 of FIG. 2) may make the determination that PAT/PMT acquisition is complete once it has valid audio/video PIDs. If the determination is made that PAT/PMT acquisition is not complete, a next buffer chunk may be transferred from the buffer at 320.

If, at 325, the determination is made that PAT/PMT acquisition is complete, the process 300 may proceed to 330. At 330, a determination may be made whether A/V play has started. The determination whether A/V play has started may be made, for example, by the CPE device 105. In embodiments, the determination whether A/V play has started may be made based upon an identification of a current player state. For example, once the first I-frame is received, the rendering starts on a display and A/V drivers update their state variables to reflect the status as "PLAYING," or a similar state name. An A/V driver may provide an API to retrieve the current A/V state. Until the PMT processing is complete, the API would return the state of A/V as "PLAYER_STARTED," or similar state name. After the I-Frame is received and the video comes up on a display, the state may change to "PLAYER_PLAYING," or similar state name. Various modules may subscribe to be notified of these state changes and handle their internal state machines accordingly. If the determination is made that A/V play has not started, a next buffer chunk may be transferred from the buffer at 320.

If, at 330, the determination is made that A/V play has started, the process 300 may proceed to 335. At 335, a decoder may be flushed. For example, the decoder 205 of FIG. 2 may be flushed by the CPE device 105.

At 340, a PTS value may be reset. The PTS value may be reset, for example, by the CPE device 105.

At 345, all buffer chunks from the first buffer chunk of the buffer to the buffer chunk that was last transferred from the buffer may be transferred from the buffer. For example, the CPE device 105 may re-initiate a transfer of buffer chunks from the buffer, starting with a transfer of the first buffer chunk in the buffer and ending with a transfer of the buffer chunk that was last transferred from the buffer prior to the decoder being flushed at 335. In embodiments, the CPE device 105 may transfer the buffer chunks from the buffer (e.g., acquisition buffer) to a decoder (e.g., decoder 205).

At 350, I-Frame acquisition may be set to true. I-Frame acquisition may be set to true, for example, by the CPE device 105. After I-Frame acquisition is set to true, a next buffer chunk may be transferred from the buffer at 320.

Figure 4:
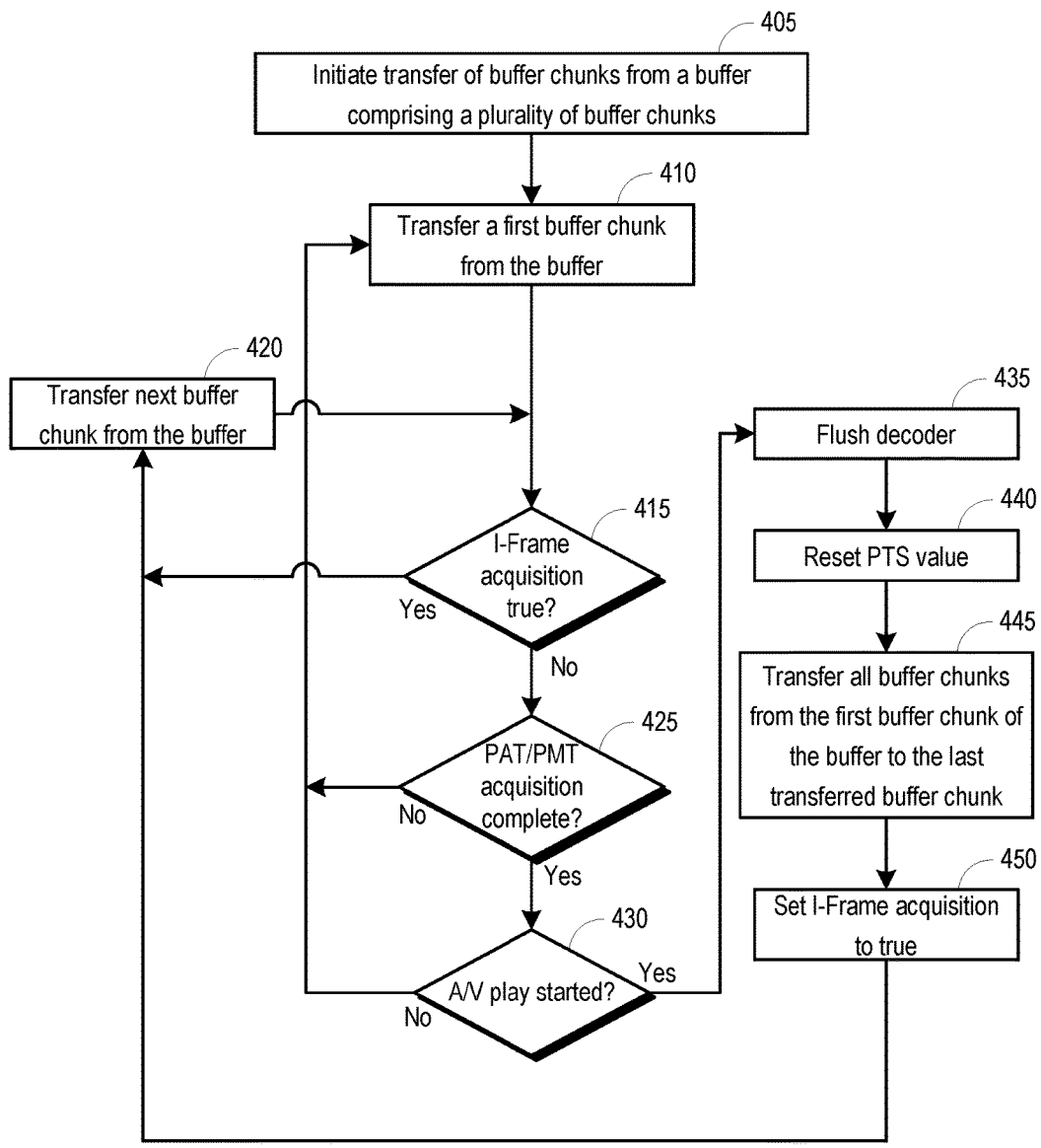
FIG. 4 is a flowchart illustrating an example process operable to facilitate a repetitive transfer of a first buffer chunk.

FIG. 4 is a flowchart illustrating an example process 400 operable to facilitate a repetitive transfer of a first buffer chunk. The process 400 can begin at 405, when a transfer of buffer chunks from a buffer comprising a plurality of buffer chunks is initiated. In embodiments, the transfer of buffer chunks from the buffer may be initiated in response to a request for content or information. For example, a CPE device (e.g., CPE device 105 of FIG. 1) may receive a request for content (e.g., multimedia content, gaming content, etc.) or information (e.g., guide data, EPG (electronic program guide) data, etc.) from a user and/or client device (e.g., client device 110 of FIG. 1). In response to the request for content or information, the CPE device 105 may retrieve one or more packets associated with the content or information (e.g., from a server such as an upstream server), and the CPE device 105 may store the retrieved one or more packets in a buffer (e.g., within an acquisition buffer) as one or more buffer chunks. The CPE device 105 may initiate a transfer of the buffer chunks from the buffer to a decoder (e.g., decoder 205 of FIG. 2).

At 410, a first buffer chunk may be transferred from the buffer. In embodiments, the CPE device 105 may transfer the first buffer chunk in the buffer to a decoder (e.g., decoder 205 of FIG. 2). For example, a DMA (direct memory access) operation may be utilized to transfer the first buffer chunk from the buffer to a demultiplexer and decoder for A/V play.

At 415, a determination may be made whether I-Frame acquisition is true. The determination whether I-Frame acquisition is true may be made, for example, by the CPE device 105. In embodiments, the determination whether I-Frame acquisition is true may be based upon whether a designated trigger has occurred as a result of a first I-Frame being processed. For example, a flag (e.g., first_picture interrupt (or some similar names)) may be triggered when the first I-Frame is processed, and the flag may provide an indication as to whether the first I-Frame processing is complete. Interested subscribers (e.g., AV and SA modules) may be notified of this event.

If, at 415, the determination is made that I-Frame acquisition is true, the process 400 may proceed to 420. At 420, the next buffer chunk in the buffer may be transferred. In embodiments, the CPE device 105 may transfer the next buffer chunk in the buffer to a decoder (e.g., decoder 205 of FIG. 2). For example, a DMA operation may be utilized to transfer the next buffer chunk from the buffer to a demultiplexer and decoder for A/V play. After the next buffer chunk is transferred from the buffer, the process 400 may return to 415.

If, at 415, the determination is made that I-Frame acquisition is not true, the process 400 may proceed to 425. At 425, a determination may be made whether PAT/PMT acquisition is complete. The determination whether PAT/PMT acquisition is complete may be made, for example, by the CPE device 105. In embodiments, the determination whether PAT/PMT acquisition is complete may be based upon a determination whether audio/video PID values have been successfully determined. For example, ProcessPAT( ) or ProcessPMT( ) callback functions may be invoked automatically when a section filter detects a PAT or PMT packet in the incoming stream. If the PMT is processed successfully, the audio/video PID values are determined correctly. The service acquisition module (e.g., service acquisition module 210 of FIG. 2) may make the determination that PAT/PMT acquisition is complete once it has valid audio/video PIDs. If the determination is made that PAT/PMT acquisition is not complete, a next buffer chunk may be transferred from the buffer at 410.

If, at 425, the determination is made that PAT/PMT acquisition is complete, the process 400 may proceed to 430. At 430, a determination may be made whether A/V play has started. The determination whether A/V play has started may be made, for example, by the CPE device 105. In embodiments, the determination whether A/V play has started may be made based upon an identification of a current player state. For example, once the first I-frame is received, the rendering starts on a display and A/V drivers update their state variables to reflect the status as "PLAYING," or a similar state name. An A/V driver may provide an API to retrieve the current A/V state. Until the PMT processing is complete, the API would return the state of A/V as "PLAYER_STARTED," or similar state name. After the I-Frame is received and the video comes up on a display, the state may change to "PLAYER_PLAYING," or similar state name. Various modules may subscribe to be notified of these state changes and handle their internal state machines accordingly. If the determination is made that A/V play has not started, a next buffer chunk may be transferred from the buffer at 410.

If, at 430, the determination is made that A/V play has started, the process 400 may proceed to 435. At 435, a decoder may be flushed. For example, the decoder 205 of FIG. 2 may be flushed by the CPE device 105.

At 440, a PTS value may be reset. The PTS value may be reset, for example, by the CPE device 105.

At 445, all buffer chunks from the first buffer chunk of the buffer to the buffer chunk that was last transferred from the buffer may be transferred from the buffer. For example, the CPE device 105 may re-initiate a transfer of buffer chunks from the buffer, starting with a transfer of the first buffer chunk in the buffer and ending with a transfer of the buffer chunk that was last transferred from the buffer prior to the decoder being flushed at 335. In embodiments, the CPE device 105 may transfer the buffer chunks from the buffer (e.g., acquisition buffer) to a decoder (e.g., decoder 205).

At 450, I-Frame acquisition may be set to true. I-Frame acquisition may be set to true, for example, by the CPE device 105. After I-Frame acquisition is set to true, a next buffer chunk may be transferred from the buffer at 420.

Figure 5:
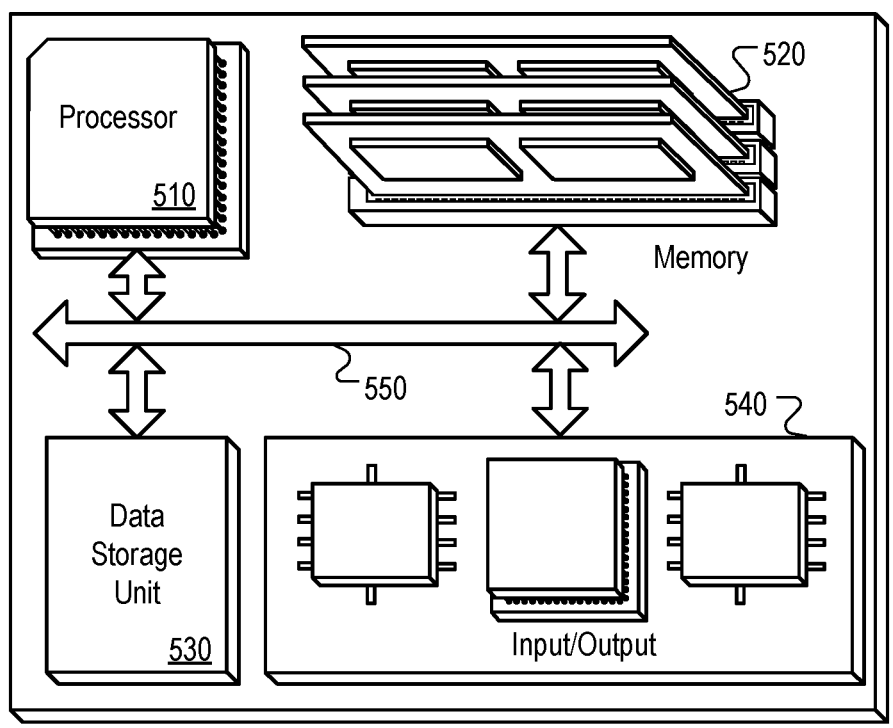
FIG. 5 is a block diagram of a hardware configuration operable to facilitate a transfer of one or more buffer chunks including an I-Frame.

FIG. 5 is a block diagram of a hardware configuration 500 operable to facilitate a transfer of one or more buffer chunks including an I-Frame. The hardware configuration 500 can include a processor 510, a memory 520, a storage device 530, and an input/output device 540. Each of the components 510, 520, 530, and 540 can, for example, be interconnected using a system bus 550. The processor 510 can be capable of processing instructions for execution within the hardware configuration 500. In one implementation, the processor 510 can be a single-threaded processor. In another implementation, the processor 510 can be a multi-threaded processor. The processor 510 can be capable of processing instructions stored in the memory 520 or on the storage device 530.

The memory 520 can store information within the hardware configuration 500. In one implementation, the memory 520 can be a computer-readable medium. In one implementation, the memory 520 can be a volatile memory unit. In another implementation, the memory 520 can be a non-volatile memory unit.

In some implementations, the storage device 530 can be capable of providing mass storage for the hardware configuration 500. In one implementation, the storage device 530 can be a computer-readable medium. In various different implementations, the storage device 530 can, for example, include a hard disk device, an optical disk device, flash memory or some other large capacity storage device. In other implementations, the storage device 530 can be a device external to the hardware configuration 500.

The input/output device 540 provides input/output operations for the hardware configuration 500. In embodiments, the input/output device 540 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a client device 110 of FIG. 1 (e.g., television, computer, tablet, mobile device, etc.). In embodiments, the input/output device can include driver devices configured to send communications to, and receive communications from one or more networks (e.g., subscriber network 120 of FIG. 1, WAN 115 of FIG. 1, local network 125 of FIG. 1, etc.).

Those skilled in the art will appreciate that the invention improves upon methods and systems for transferring content from a buffer to a decoder for content playback. Methods, systems, and computer readable media can be operable to facilitate a transfer of one or more buffer chunks including an I-Frame. When a new play or media transition occurs, a transfer of buffer chunks from a buffer to a decoder may be initiated such that an I-Frame at the beginning of the buffer is transferred and available to a client for playback. A decoder may be flushed a new transfer of buffer chunks beginning with the first buffer chunk may be initiated when a determination is made that PAT/PMT acquisition is complete and A/V play has started. A first buffer chunk may be repetitively transferred from the buffer until a determination is made that PAT/PMT acquisition is complete and A/V play has started.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   initiating a transfer of one or more buffer chunks from a buffer to a decoder;
   determining that I-Frame acquisition is not true;
   after determining that PAT/PMT acquisition has been completed and audio/video play has started:
   flushing the decoder;
   resetting a PTS value;
   transferring the buffer chunks from the first buffer chunk of the buffer to the last buffer chunk that was transferred prior to the determination that PAT/PMT acquisition has been completed and audio/video play has started; and
   continuing with the transfer of buffer chunks from the buffer to the decoder.

2. The method of claim 1, wherein the buffer comprises an acquisition buffer.

3. The method of claim 1, further comprising:
after determining that PAT/PMT acquisition has been completed and audio/video play has started, setting an I-Frame acquisition tag to true.

4. The method of claim 1, wherein the buffer is stored in pipeline memory of a customer premise equipment device.

5. The method of claim 4, wherein the customer premise equipment device comprises a set-top box.

6. The method of claim 1, wherein the transfer of one or more buffer chunks from a buffer to a decoder is initiated in response to a request for playback of a piece of content associated with the buffer chunks.

7. The method of claim 1, wherein the transfer of one or more buffer chunks from a buffer to a decoder is initiated in response to an identification of a PAT or PMT version change.

8. One or more non-transitory computer readable media having instructions operable to cause one or more processors to perform the operations comprising:
initiating a transfer of one or more buffer chunks from a buffer to a decoder;
determining that I-Frame acquisition is not true;
after determining that PAT/PMT acquisition has been completed and audio/video play has started:
flushing the decoder;
resetting a PTS value;
transferring the buffer chunks from the first buffer chunk of the buffer to the last buffer chunk that was transferred prior to the determination that PAT/PMT acquisition has been completed and audio/video play has started; and
continuing with the transfer of buffer chunks from the buffer to the decoder.

9. The one or more non-transitory computer-readable media of claim 8, wherein the buffer comprises an acquisition buffer.

10. The one or more non-transitory computer-readable media of claim 8, wherein the instructions are further operable to cause one or more processors to perform the operations comprising:
after determining that PAT/PMT acquisition has been completed and audio/video play has started, setting an I-Frame acquisition tag to true.

11. The one or more non-transitory computer-readable media of claim 8, wherein the buffer is stored in pipeline memory of a customer premise equipment device.

12. The one or more non-transitory computer-readable media of claim 11, wherein the customer premise equipment device comprises a set-top box.

13. The one or more non-transitory computer-readable media of claim 8, wherein the transfer of one or more buffer chunks from a buffer to a decoder is initiated in response to a request for playback of a piece of content associated with the buffer chunks.

14. The one or more non-transitory computer-readable media of claim 8, wherein the transfer of one or more buffer chunks from a buffer to a decoder is initiated in response to an identification of a PAT or PMT version change.

* * * * *